C. M. ANGELL.
ELECTRIC HEATER.
APPLICATION FILED MAY 11, 1914.
1,126,935.
Patented Feb. 2, 1915.
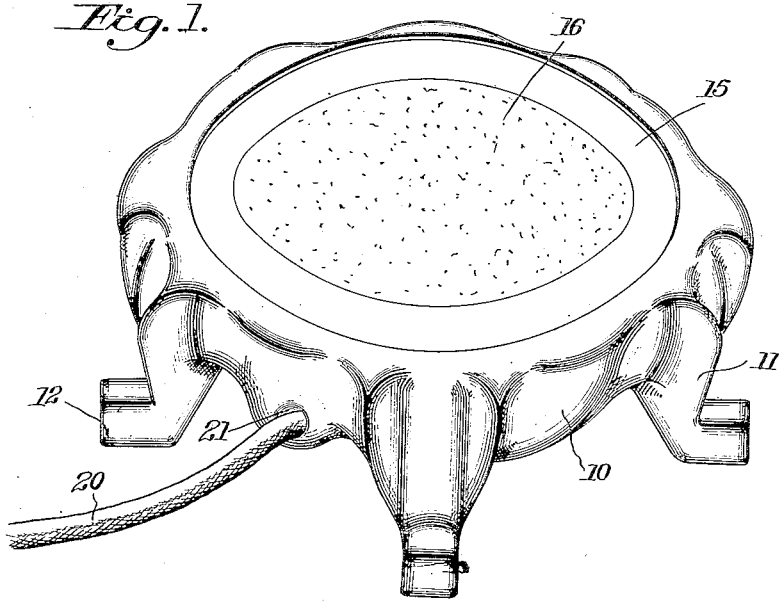
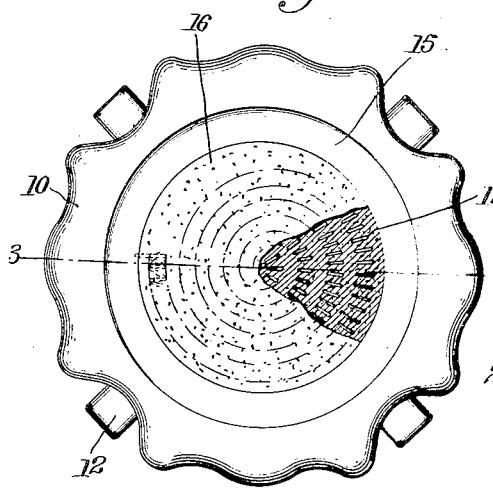
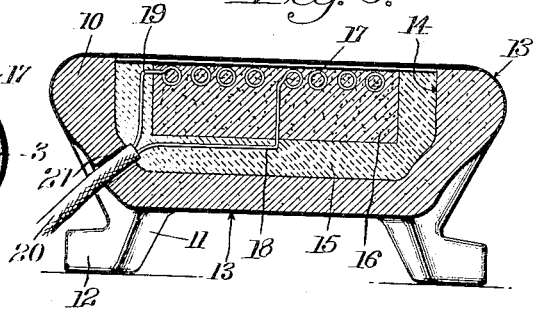
Witnesses
G. T. Baker.
E. J. Greenewald.
Inventor
Chester M. Angell,
by Foster Freeman Watson & Cort
Attorneys

UNITED STATES PATENT OFFICE.

CHESTER M. ANGELL, OF SANTA BARBARA, CALIFORNIA, ASSIGNOR TO THE VAN BRIGGLE TILE AND POTTERY COMPANY, OF COLORADO SPRINGS, COLORADO, A CORPORATION OF COLORADO.

ELECTRIC HEATER.

1,126,935.  Specification of Letters Patent.  Patented Feb. 2, 1915.

Application filed May 11, 1914. Serial No. 837,834.

*To all whom it may concern:*

Be it known that I, CHESTER M. ANGELL, a citizen of the United States, and resident of Santa Barbara, county of Santa Barbara, State of California, have invented certain new and useful Improvements in Electric Heaters, of which the following is a specification.

My invention relates to electric heaters and more particularly to a portable electric heating device inclosed in a decorative pottery stand and suitable for use as a stove, cigar lighter, toaster, hot water and chafing dish heater and other purposes.

The principal object of my invention is to provide a stand or support for the heat generating element which is made of a pottery material mechanically strong, easily worked and capable of receiving an artistic finish such as enamel glaze; the said material also having suitable electrical insulating properties and the physical properties of light weight, resistance to high temperatures, and heat insulation. Furthermore, the material used for making the stand is commercially inexpensive and requires neither expensive machinery nor skilled labor in the making of the finished product.

A further object of my invention is to position the heat generating element and body in its supporting stand in such a manner that it will efficiently transfer the heat generated.

Other objects and the novel features of the invention will be apparent from the following description taken in connection with the drawing in which, Figure 1 is a perspective view of a heater embodying my invention; Fig. 2 is a plan view of the same, part of the top being broken away to show the arrangement of the heating element; Fig. 3 is a vertical central sectional view of the same.

Referring to the drawing, 10 designates an earthenware porcelain or similar pottery receptacle of any suitable shape depending on the purpose for which it is intended. The receptacle 10 comprises the support or stand for the heat generating element and body, and has the integral legs 11 which are provided with laterally extending feet 12. The said feet 12 support the receptacle portion 10 apart from the surface on which it rests. The stand is molded of suitable material such as clay, and burned, being made of any decorative design or pleasing appearance and provided with a colored enamel glazed outer surface 13 to produce an artistic finish.

The pottery body 10 has a cavity 14 therein opening at the top to form a receptacle, the wall of said cavity being provided with a lining 15 of some suitable heat insulating material such as asbestos. A core 16 of refractory clay or other similar material is embedded in the lining 15 and has its upper surface exposed so that the article or material to be heated may be placed in direct contact with said refractory body.

The resistance element which generates the heat and heats the refractory core 16 comprises a continuous coiled non-oxidizable wire 17 arranged in the form of a spiral and embedded in the core 16 so that parts of said element will be disposed just at the top surface of said core. Current is supplied to the resistance element 17 by means of the conductors 18 and 19 leading respectively to the ends of the wire 17, the said conductors 18 and 19 being insulated from each other in the twin conductor cable 20 leading into the receptacle through an opening 21 in the bottom thereof. The cable 20 may be provided with a suitable appliance to connect the conductors 18 and 19 to a source of current.

The operation of the heater will be apparent from the foregoing description. Current is passed through the wire coil embedded in the core 16, which heats the coil and also the core. The heat insulating lining surrounding the core 16 prevents the loss of heat and the glazed pottery receptacle also is a good non-conductor of heat. The construction of the device thus prevents any considerable loss of heat.

I do not wish to be limited to the exact details of construction as shown and described as it will be obvious that they may be varied without departing from the spirit of the invention.

Having described my invention what I claim and desire to secure by Letters-Patent is, 1. As a new article of manufacture, an electric heater comprising a pottery receptacle open at the top and substantially closed at the bottom, a lining of heat insulating material therein, a refractory clay body surrounded by said heat insulating material, and a resistance element carried by said refractory body.

2. As a new article of manufacture, an electric stove comprising a pottery receptacle open at the top and substantially closed at the bottom, and having legs to support it apart from the surface on which it rests, a lining of heat insulating material in said receptacle, a refractory clay body embedded in said heat insulating material and having its upper surface exposed, and a resistance element embedded in and disposed close to the upper exposed surface of said refractory body.

In testimony whereof I affix my signature in presence of two witnesses.

CHESTER M. ANGELL.

Witnesses:
 J. R. THOMPSON,
 ALFRED W. ROBERTSON.